April 19, 1949.  L. A. MAJNERI  2,467,560
HYDRAULIC BRAKING SYSTEM
Filed Dec. 26, 1944  10 Sheets-Sheet 7
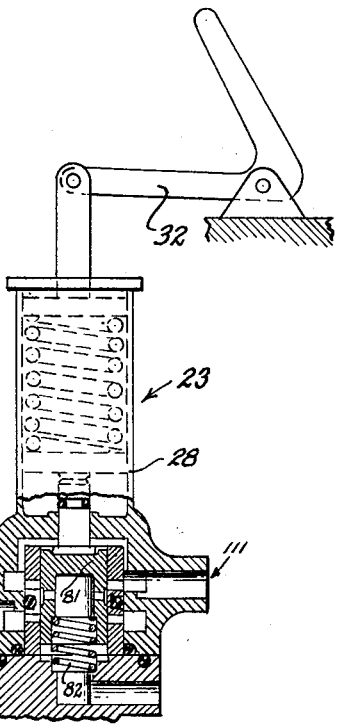
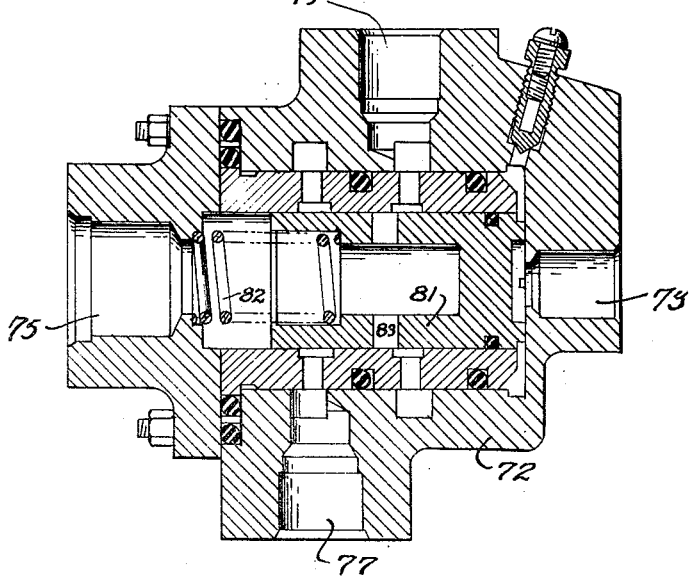
INVENTOR.
LUDWIG A. MAJNERI
BY
Whittemore Hulbert & Belknap
ATTORNEYS

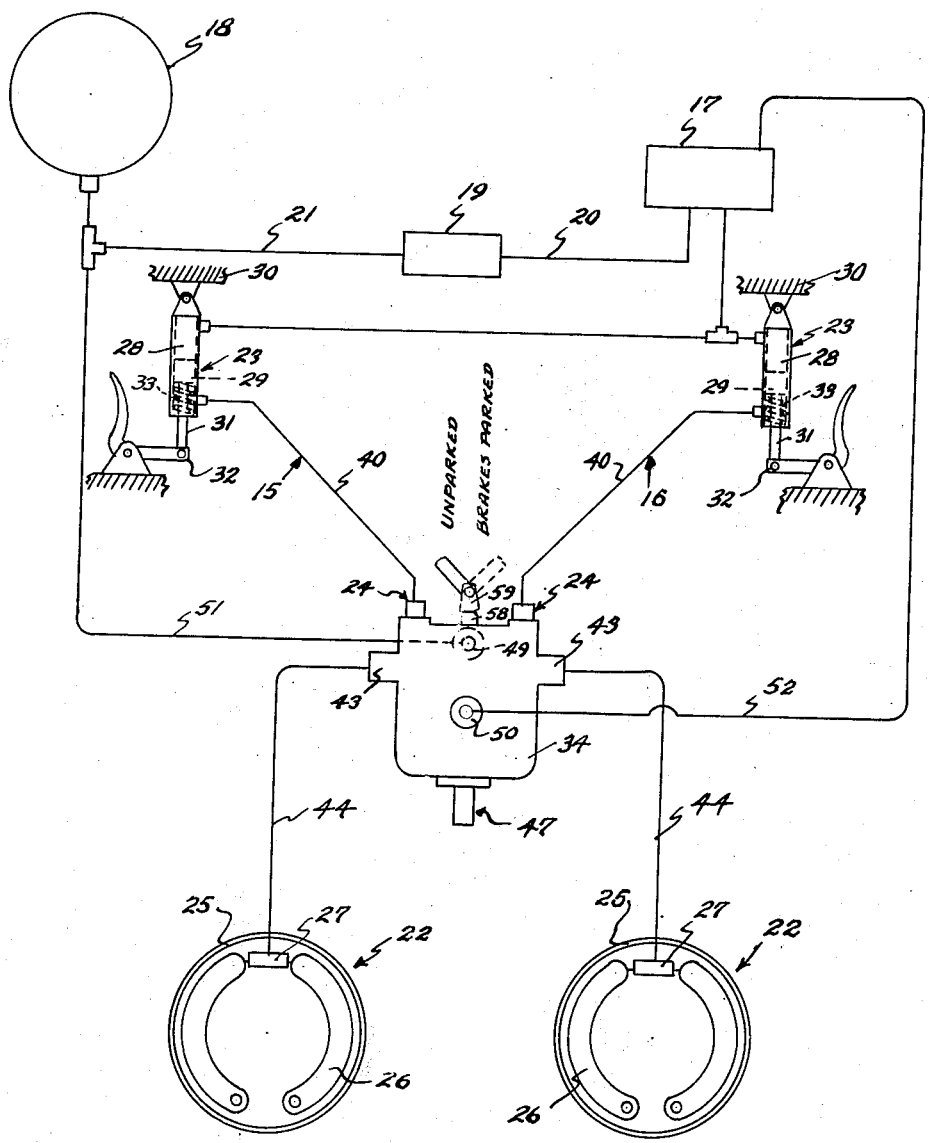

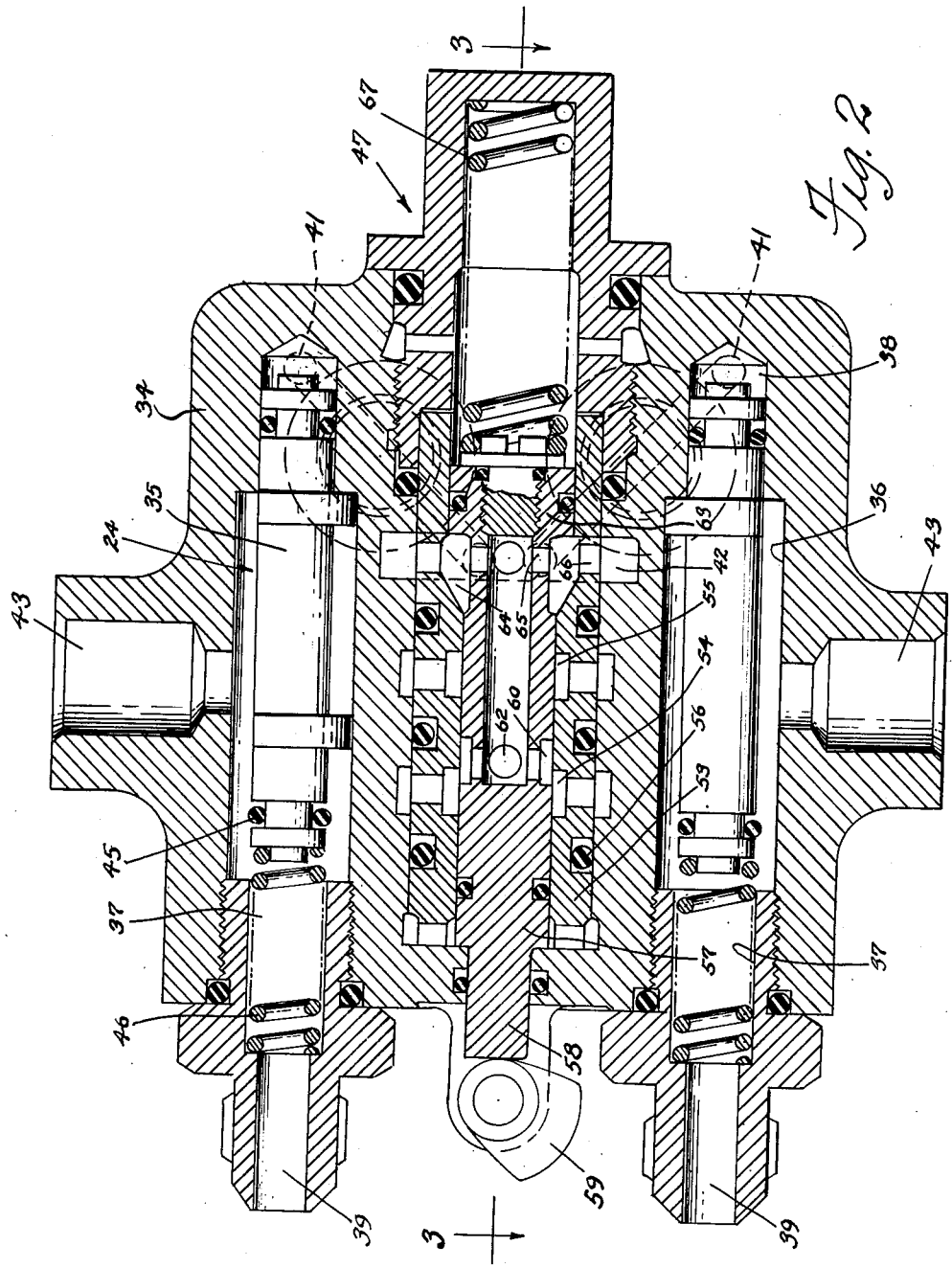

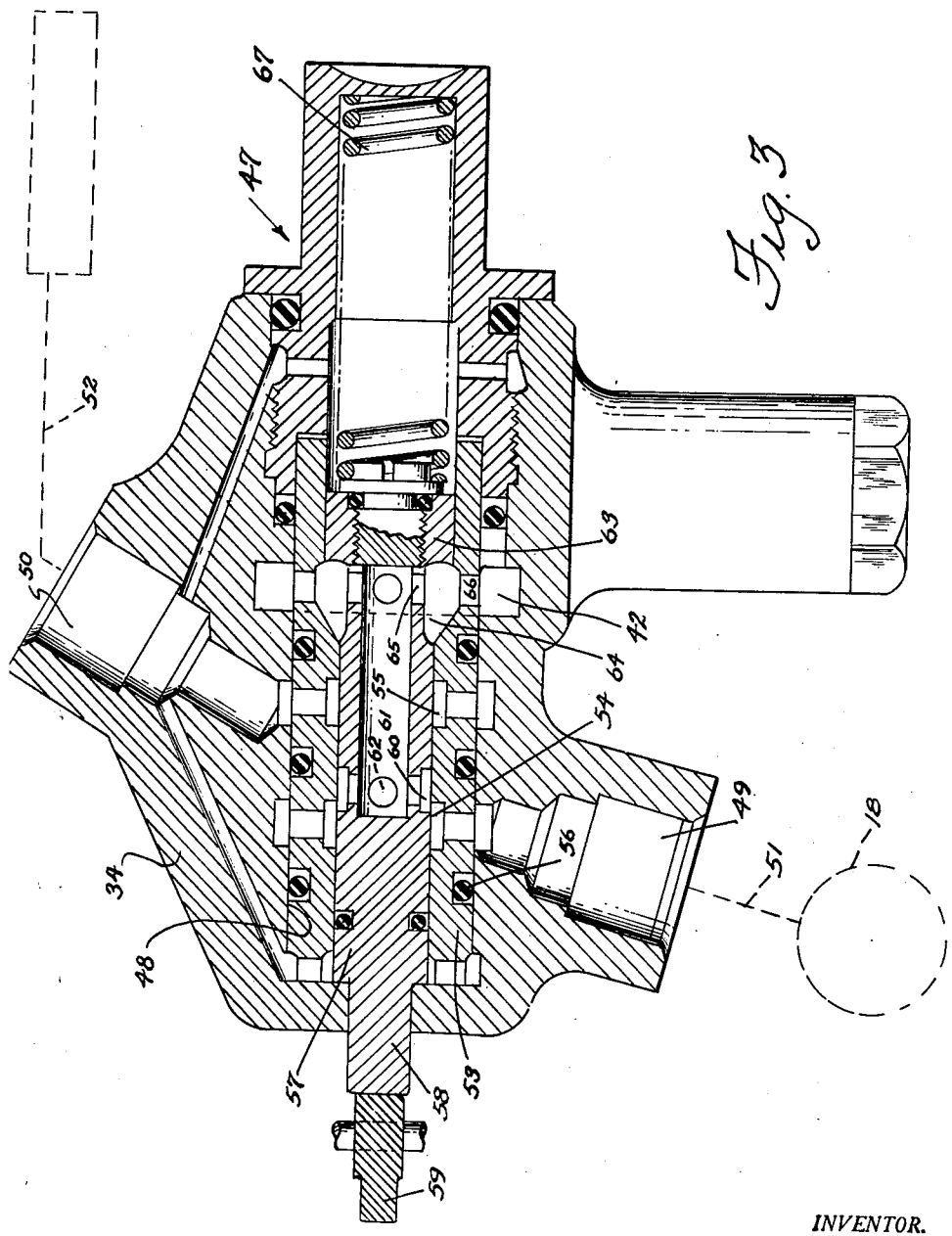

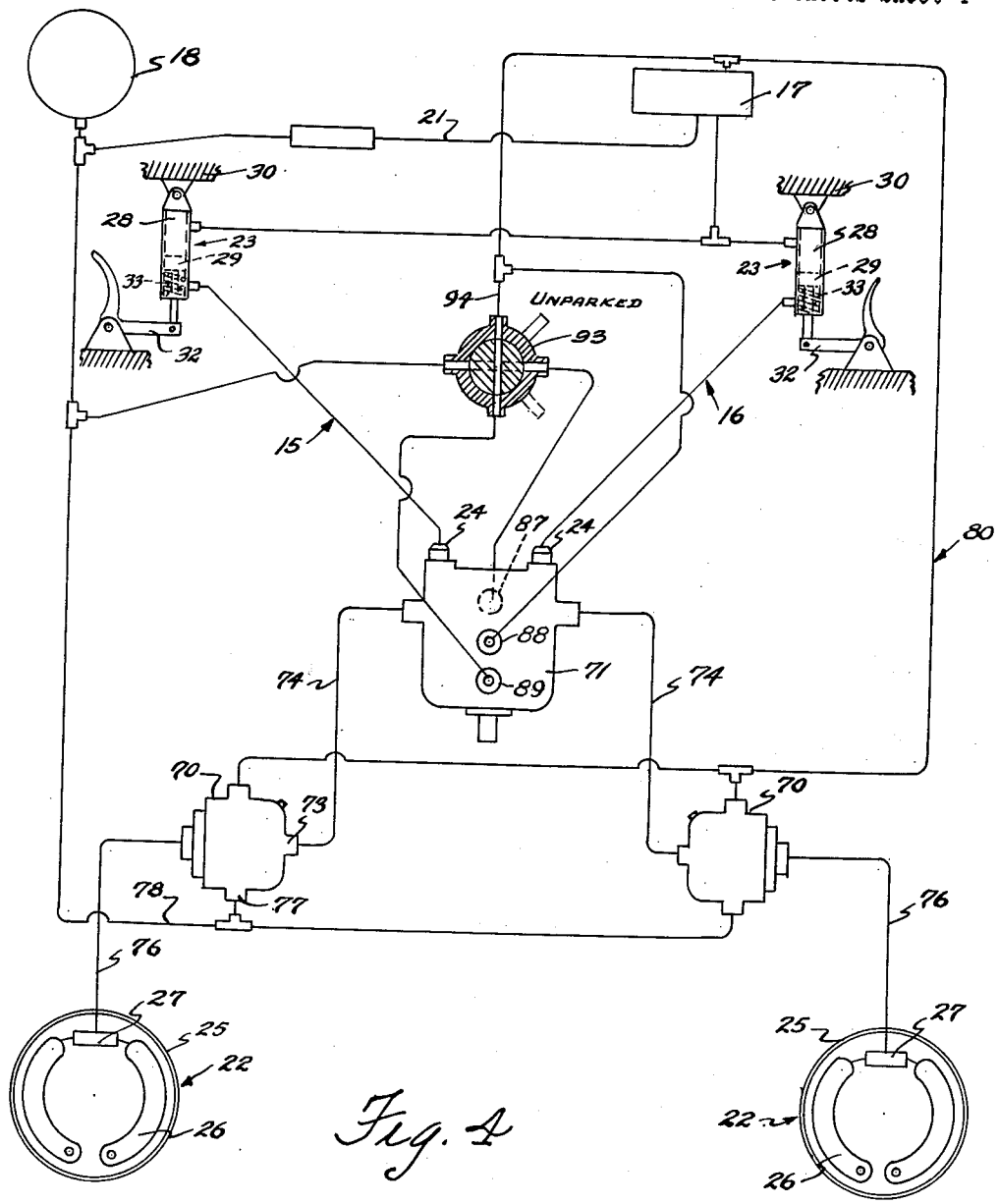

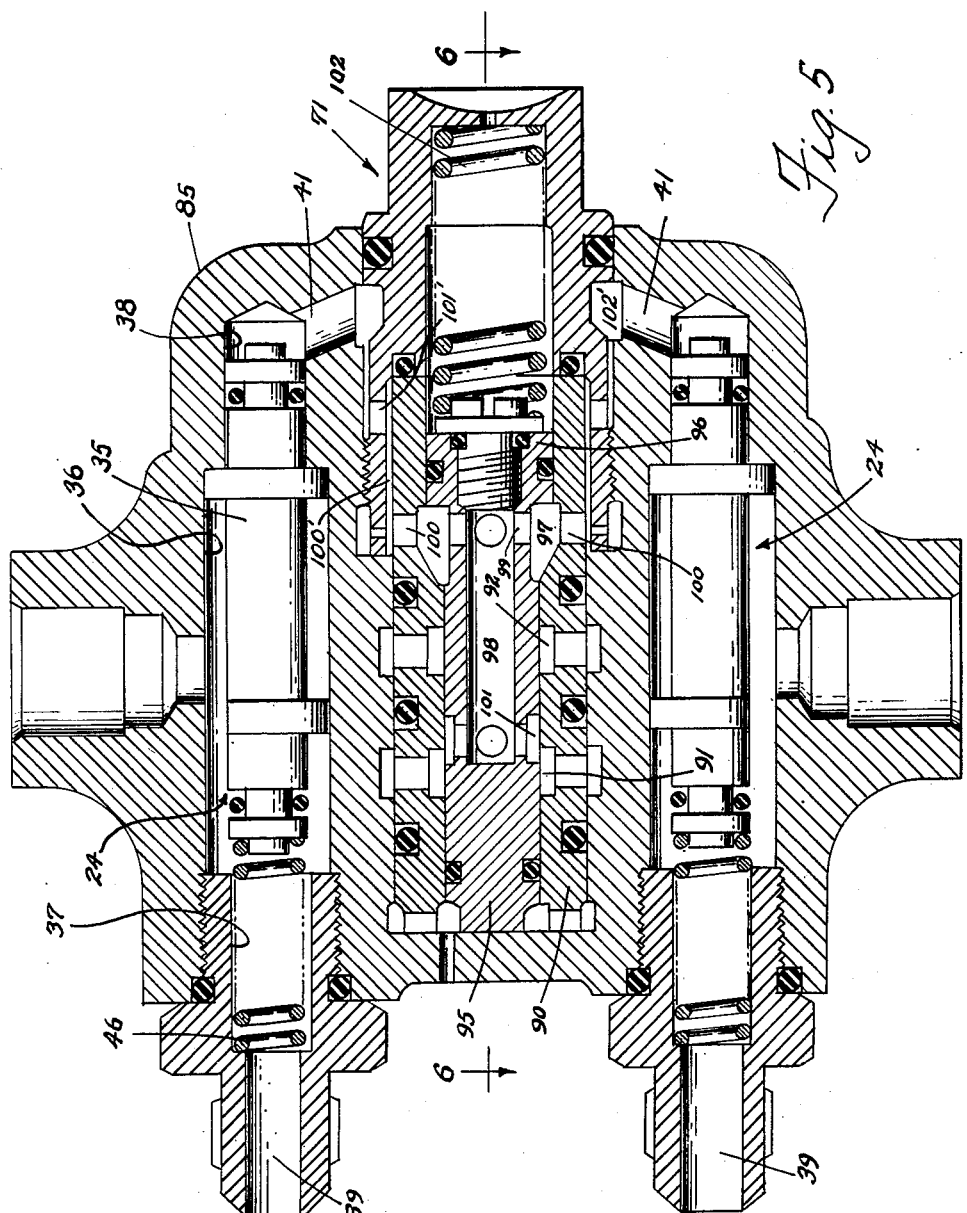

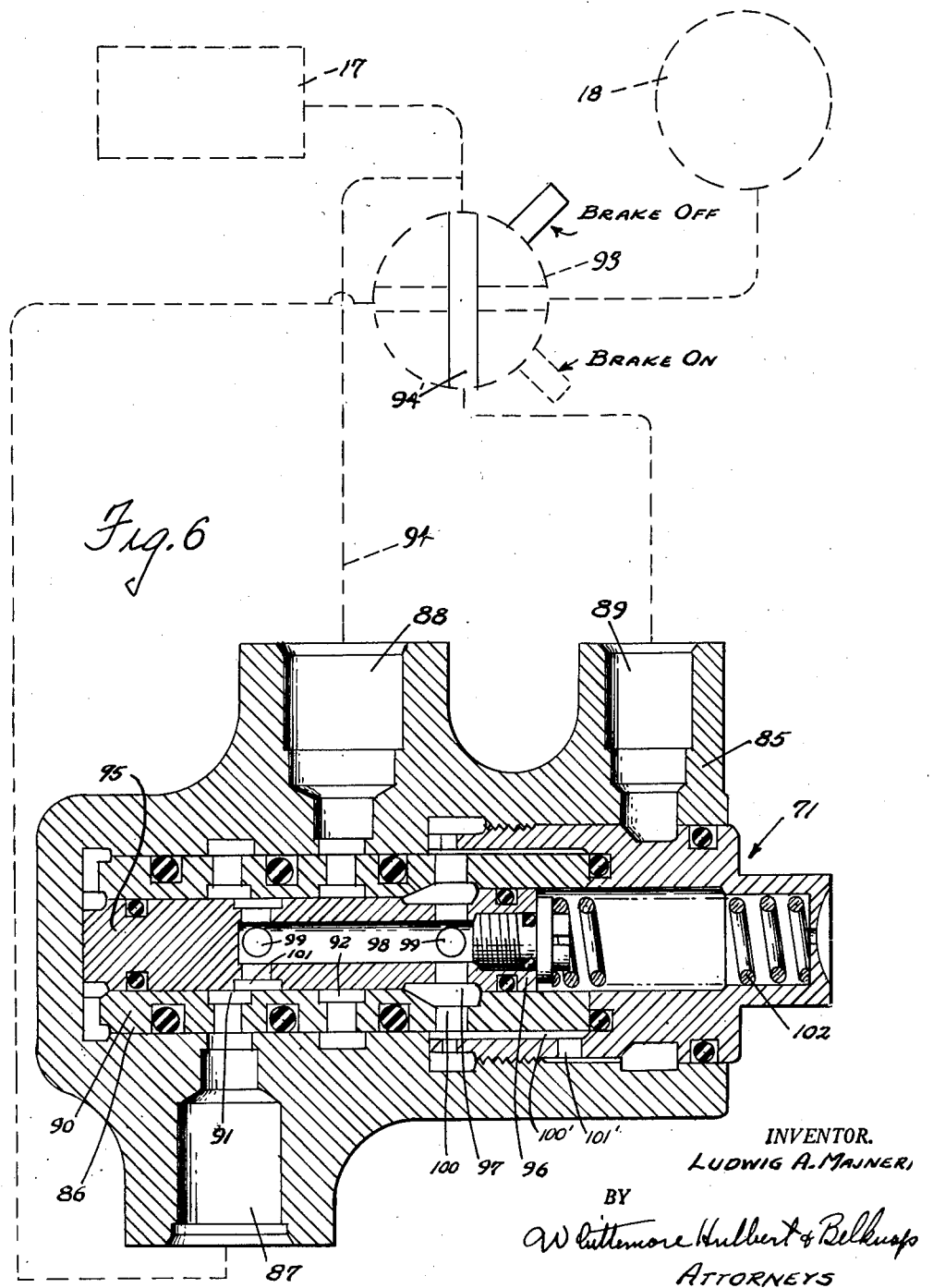

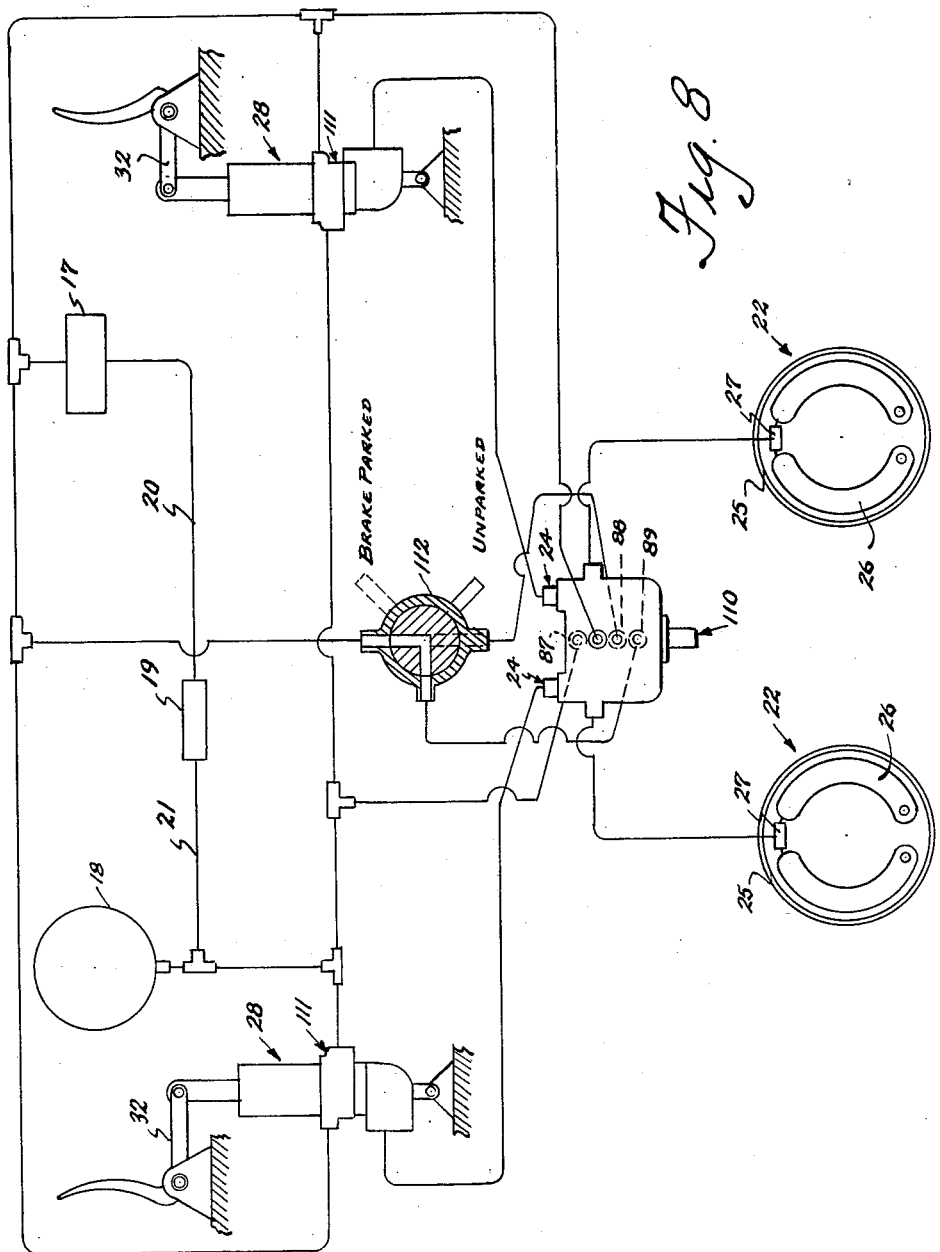

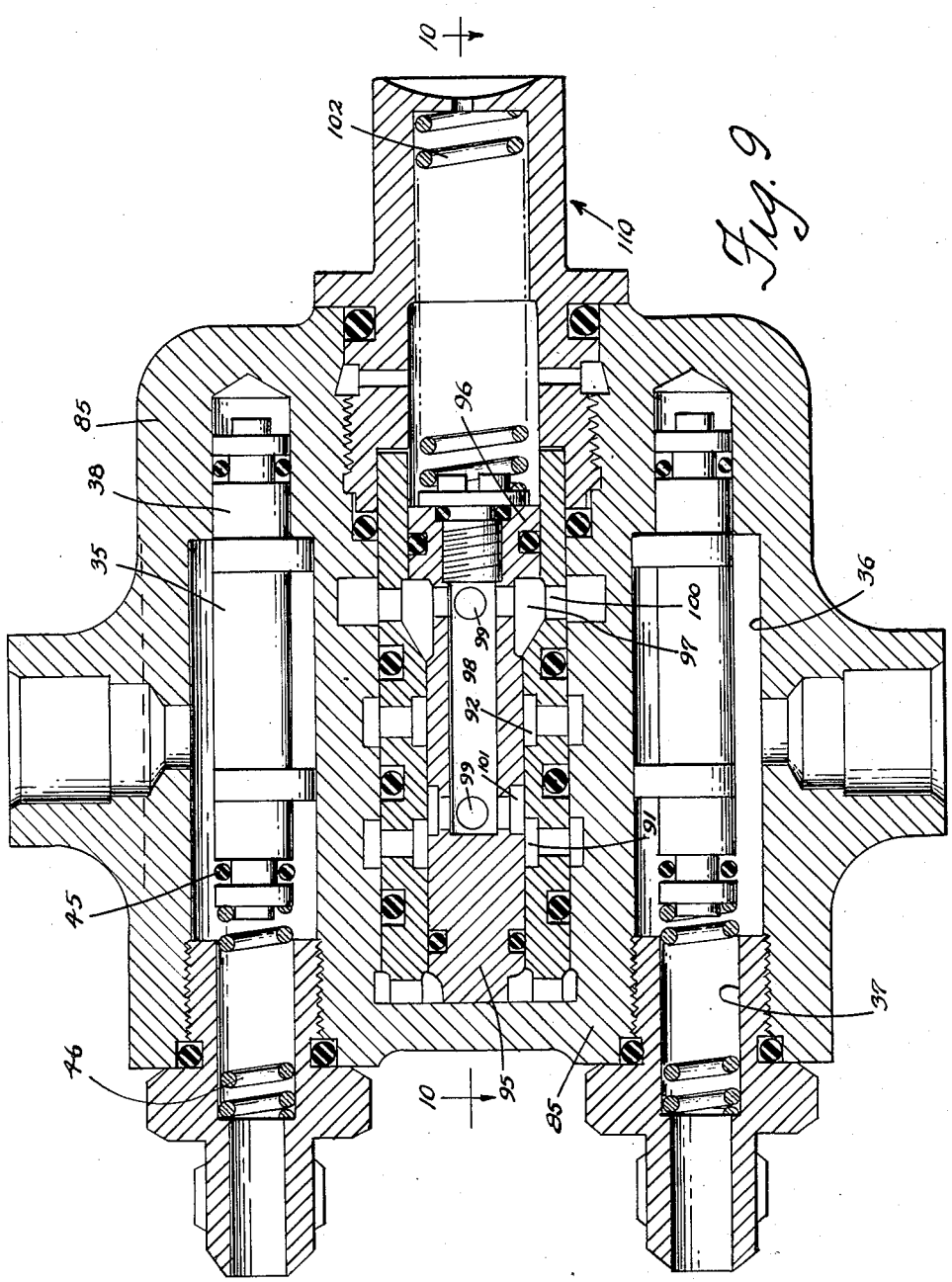

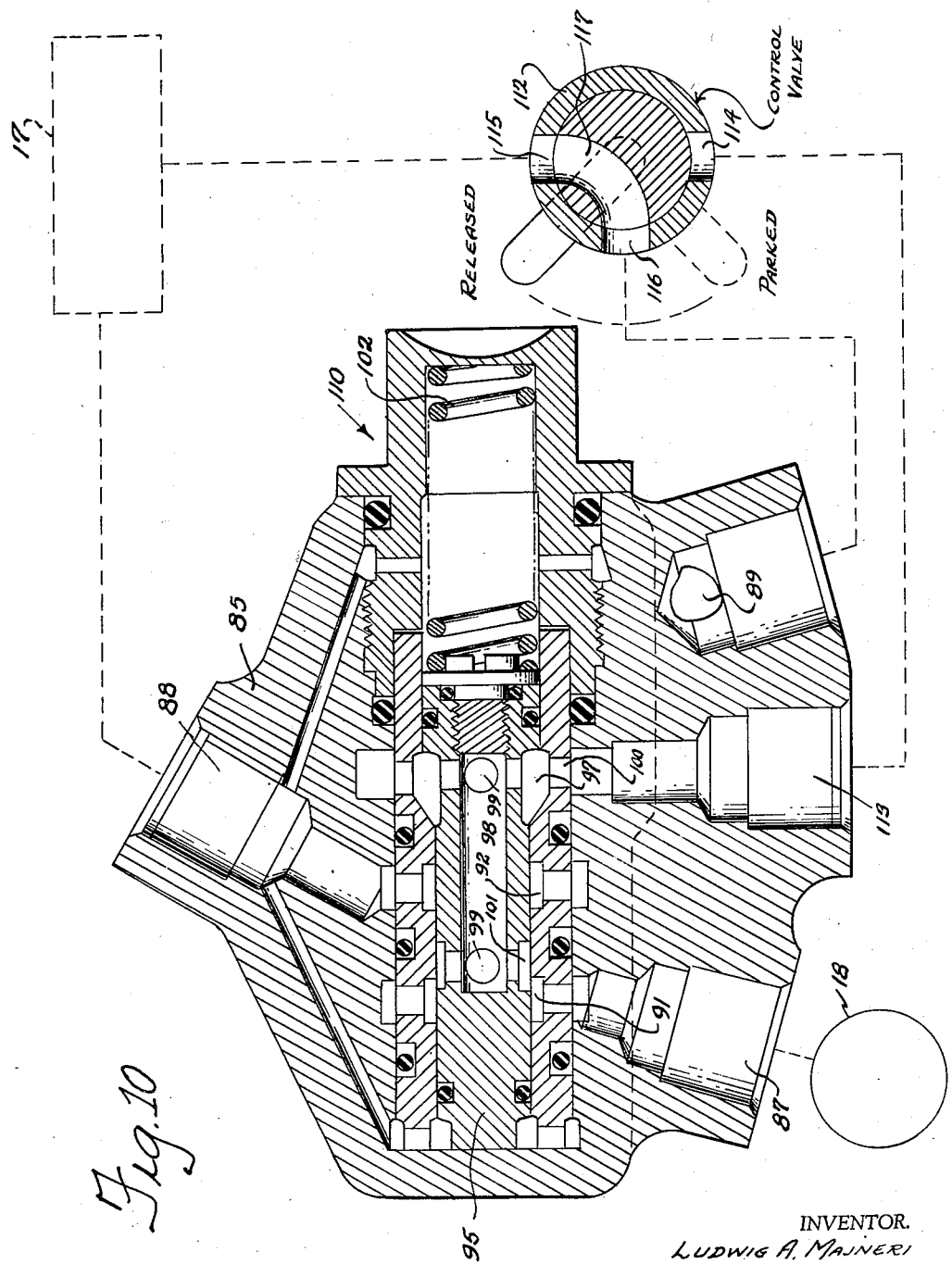

Patented Apr. 19, 1949

2,467,560

UNITED STATES PATENT OFFICE 2,467,560

HYDRAULIC BRAKING SYSTEM

Ludwig A. Majneri, Grosse Pointe, Mich., assignor to The Warner Aircraft Corporation, Detroit, Mich., a corporation of Michigan Application December 26, 1944, Serial No. 569,786

9 Claims. (Cl. 60—97)

This invention relates to hydraulic braking systems and refers more particularly to installations embodying separate braking systems wherein the brake or brakes in each system are capable of independent operation.

Installations employing separate braking systems are usually employed on aircraft where it is desirable to brake the ground engaging wheels at opposite sides of the aircraft independently of one another to assist in maneuvering the aircraft on the ground. However, when the aircraft is parked it is also desirable to apply the brakes of all of the systems in unison and to maintain the brakes applied throughout the parking period. The present types of parking devices available for the above purpose are none too satisfactory, as difficulty has been experienced in maintaining the brakes applied regardless of temperature variations in the surrounding atmosphere and irrespective of small leaks that may be present in the system. This difficulty is especially critical in the larger types of aircraft where the hydraulic pressure supply tubes are necessarily long or, in other words, where the displacement of the systems is substantially great.

With the above in view this invention contemplates a hydraulic brake installation embodying a parking feature which assures maintaining the brakes applied regardless of temperature changes and irrespective of the displacement of the system. According to the present invention, the high pressure accumulator usually forming a part of standard equipment on aircraft and the hydraulic fluid reservoir are capable of being alternatively connected to the brakes in all of the systems by a single valve. This valve not only acts as a reducing valve to limit the pressure supplied by the accumulator to the required parking pressure but, in addition, operates to replenish fluid from the accumulator in the event of a drop in fluid pressure in the systems and to return fluid in the systems to the reservoir in the event expansion of the fluid in the systems takes place.

Another object of this invention is to provide a power parking valve capable of being used in a hydraulic brake installation wherein each braking system comprises a power valve responsive to operation of the manually operable devices to connect the hydraulic brake actuators to the accumulator.

The foregoing as well as other objects will be made more apparent as this description proceeds, especially when considered in connection with the accompanying drawings, wherein:

Figure 1 is a diagrammatic view of a hydraulic brake installation embodying the features of this invention;

Figure 2 is a sectional view through the power parking valve shown in Figure 1;

Figure 3 is a sectional view taken substantially on the plane indicated by the line 3—3 of Figure 2;

Figure 4 is a diagrammatic view of a modified brake installation embodying further features of this invention;

Figure 5 is a sectional view through the power parking valve shown in Figure 4;

Figure 6 is a sectional view taken substantially on the line 6—6 of Figure 5;

Figure 7 is a sectional view through one of the power brake valves shown in Figure 4;

Figure 8 is a diagrammatic view of still another embodiment of this invention;

Figure 9 is a sectional view of the power parking valve shown in Figure 8;

Figure 10 is a sectional view taken substantially on the line 10—10 of Figure 9; and Figure 11 is a sectional view through one of the power brake valves shown in Figure 8.

Although it will be understood as this description proceeds that the invention may be used in connection with practically any type of hydraulic braking system for the purpose of maintaining the brake or brakes in the latter applied, nevertheless, the invention is shown for the purpose of illustration as embodied in an installation having two separate braking systems of the general type used on aircraft.

Referring first to the embodiment of the invention shown in Figures 1 to 3 inclusive of the drawing, it will be noted that the installation shown in Figure 1 comprises two braking systems 15 and 16. In addition the installation is shown as having a reservoir 17 for braking fluid and an accumulator 18 adapted to contain hydraulic braking fluid under relatively high pressure. A pump 19 is provided having the intake side connected to the reservoir 17 by a conduit 20 and having the exhaust side communicating with the accumulator 18 by means of a conduit 21.

Each braking system comprises at least one brake 22, a manually operable pressure producing device such, for example, as a master cylinder 23 and a control or shuttle valve 24.

The brake 22 comprises a brake drum 25 having brake friction means 26 suitably supported therein and having a hydraulic actuator 27 supported in the brake drum 25 between adjacent ends of the brake friction means 26 for operating the latter.

The device 23 comprises a cylinder 28 and a piston 29 slideably mounted in the cylinder. The upper end of the cylinder is suitably pivotally mounted on a support 30 and the lower end of the cylinder is provided with an opening for receiving the piston rod 31. The piston rod 31 is connected at the lower end to a manually operable control member 32 and is connected at the upper end to the piston 29 in the cylinder 28. The piston 29 is normally urged in an upward direction by means of a coil spring 33 supported in the cylinder 28 below the piston. The upper end of the cylinder 28 is connected to the reservoir 17 and the lower end of the cylinder 28 is connected to the hydraulic actuator 27 through the shuttle valve 24. The arrangement is such that downward movement of the piston 29 by the operating member 32 causes the fluid under pressure in the cylinder 28 below the piston 29 to flow through the shuttle valve 24 to the hydraulic brake actuator 27. On the other hand when the operating member 32 is released, the spring 33 moves the piston 29 upwardly to enable the fluid under pressure to return to the reservoir. It will, of course, be understood that the brakes 22 in the two systems may be independently operated by separately manipulating the control members 32.

The shuttle valves 24 for both hydraulic braking systems are supported in a common housing 34 and each valve comprises a plunger 35 which is slideably mounted in a cylindrical chamber 36 formed in the housing 34. As shown in Figures 2 and 3 of the drawings, it will be noted that each valve chamber 36 is provided with reduced chambers 37 and 38 at opposite ends thereof. The reduced chambers 37 are provided with intake ports 39 which respectively communicate with the lower ends of the cylinders 28 in both braking systems through a conduit 40 and the chambers 38 for both valves are also respectively provided with intake ports 41 which communicate with an annular chamber 42 to be more fully hereinafter described. Upon reference to Figure 2 of the drawings, it will be noted that the chambers 36 are also provided with outlet ports 43 intermediate the inlet ports previously described and which respectively communicate with the hydraulic brake actuators 27 in both braking systems through a conduit 44.

Each valve plunger 35 has portions at opposite ends which alternatively project into the chambers 37 and 38 upon movement of the valve member in opposite directions in the chamber 36. Suitable O-ring seals 45 are provided on opposite ends of each valve member 35 to prevent the escape of fluid under pressure into the chamber 36 from either of the reduced chambers 37 and 38, depending upon which of these chambers is engaged by the valve member 35. The valve plungers 35 are normally held in the positions shown in Figure 2 of the drawings where the chambers 38 are sealed from communication with the outlet ports 43 by means of coil springs 46. In other words the coil springs 46 normally urge the valve plungers 35 to positions wherein communication is established between the master cylinders 28 and the hydraulic brake actuators 27.

A third valve 47 is provided between the control valves 24 for not only applying the brakes 22 in both systems but for maintaining these brakes applied for parking purposes. The valve 47 selected for the purpose of illustrating this embodiment of the invention is the same as one of the valves shown in my copending application Serial No. 565,359, filed November 6, 1944, now abandoned. Briefly, the third valve 47 comprises a cylindrical chamber 48 formed in the housing 34 between the chambers 36 and having inlet and outlet ports 49 and 50 respectively. The inlet port 49 communicates directly with the accumulator chamber 18 through a conduit 51 and the outlet port 50 communicates with the reservoir 17 through the medium of a conduit 52.

A sleeve 53 formed of a material having high wear resisting characteristics is secured in the chamber 48 and the bore through the sleeve is formed with axially spaced annular grooves 54 and 55. The annular groove 54 communicates with the inlet port 49 and the annular groove 55 communicates with the outlet port 50. Suitable O-ring seals 56 are provided at strategic points to prevent the escape of fluid under pressure through the joint between the sleeve 53 and bore 48.

A valve member 57 is supported in the chamber 48 for sliding movement in opposite directions and has a reduced portion 58 at the upper end which projects through the adjacent wall of the housing 34. The projection 58 is adapted for engagement with an operator in the form of a cam 59 rotatably supported on the top wall of the housing. The valve member 57 is formed with an annular groove 60 intermediate the ends thereof and is provided with a chamber 61 which communicates with the annular groove 60 through ports 62. The annular groove 60 is so positioned that it alternatively registers with the grooves 54 and 55 upon movement of the valve member 57 in opposite directions in the valve chamber 48.

The lower end of the valve member 57 is formed with an enlargement 63 which cooperates with adjacent portions of the valve member and sleeve 53 to form an annular chamber 64. The annular chamber 64 in turn communicates with the chamber 61 in the valve member 57 through ports 65 and communicates with the chamber 42 through ports 66. As previously stated the chamber 42 communicates with the lower ends of the chambers 36 through the inlet ports 41.

The valve member 57 is normally urged to the position thereof shown in Figure 2 by a coil spring 67 arranged to act on the lower end 63 of the valve member. In this position of the valve member 57 fluid under pressure from the accumulator 18 enters the inlet port 49 and passes into the valve chamber 61 through the annular groove 60 and ports 62. The fluid under pressure flows from the chamber 61 through the ports 65 into chamber 64 and also passes into the chamber 42 through the ports 66. The fluid under pressure flows from the chamber 42 into the lower ends of the chambers 36 through the inlet ports 41 and moves the valve members 35 against the action of the springs 46 to establish communication between the inlet ports 41 and the outlet ports 43. As a result fluid under pressure is admitted to the hydraulic actuators 27 through the conduits 44 and the brakes are applied.

Attention is again directed to Figure 2 of the drawings wherein it will be noted that the pressure of the fluid in the annular chamber 64 acts upon the top surface of the enlargement 63 at the lower end of the valve member 57. When this pressure exceeds the force exerted by the spring 67, the valve member 57 is moved downwardly to close the inlet port 49. In the event the pressure in the chamber 64 rises above a predetermined value, the groove 60 registers with the groove 55 to connect the brake actuators with the reservoir 17 through the outlet port 50. This operation, of course, effects a reduction in the pressure in the braking systems and when this pressure drops below the spring pressure, the valve is again moved upwardly to close the outlet port 50. Thus it will be noted that the valve member 57 moves back and forth in the chamber 48 to maintain a predetermined parking pressure at the brakes regardless of contraction or expansion of the fluid in the braking systems.

When it is desired to release the brakes from the influence of the parking pressure, the cam 59 is rocked to force the valve member 57 downwardly against the action of the spring 67 to register the annular groove 60 with the outlet port 50 or reservoir 17. When this condition exists, the shuttle valves 35 are returned by the springs 46 to the positions shown in Figure 2, wherein the ports 41 are closed thereby and wherein the ports 39 are opened to enable independent operation of the braking systems in accordance with conventional practice.

The hydraulic brake installation shown in Figures 4 to 7 inclusive is similar to the first described form of the invention in that two independent braking systems are provided. Accordingly the same reference characters employed in the first described form of the invention are used to indicate corresponding parts of this embodiment. The principal difference between this embodiment and the one previously described is that a power valve 70 is provided in each system and also the specific construction of the parking valve 71 is somewhat different.

The power valve 70 is located in each system between the shuttle valve 24 and the hydraulic actuator 27. One type of power valve which has been successfully used is indicated in Figure 7 of the drawings and is of the same construction as the power valve assembly shown in my co-pending application Serial No. 546,347, filed July 24, 1944, now abandoned. Briefly this valve comprises a casing 72 having an intake port 73 communicating with the outlet port 43 of the shuttle valve through a conduit 74 and is provided with an outlet port 75 which communicates with the hydraulic actuator 27 through the medium of a conduit 76. In addition the casing 72 is provided with a second inlet port 77 which communicates with the accumulator 18 through the conduit 78 and is further provided with a second outlet port 79 which communicates with the reservoir 17 through the medium of a conduit 80.

Assuming that the brake 22 in one system is to be operated, it will be noted that movement of the operating member 32 to its operative position affects a downward movement of the piston 29 in the cylinder 28 and thereby forces fluid under pressure from the master cylinder 23 through the shuttle valve 24 to the inlet port 73. As fluid under pressure enters the casing 72 through the inlet port 73, the valve member 81 in the casing is moved against the action of the spring 82 to register the port 83 in the valve member with the inlet port 77. As a result fluid under pressure flows from the accumulator 18 through the inlet port 77 to the outlet port 75 and since the latter is connected to the brake actuator 27, it follows that this actuator is operated by the fluid under pressure to apply the brake 22. On the other hand when the operating member 32 is released, the spring 82 returns the valve member 81 to the position shown in Figure 7 wherein communication is established between the port 75 and the port 79. As a result the brake actuator 27 is connected to the reservoir and the brake is released. The other brake system operates in an identical manner and a description of the same is believed unnecessary.

The parking valve 71 is shown more in detail in Figures 5 and 6. This valve comprises a casing 85 which is similar to the casing 34 previously described in that it houses the two shuttle valves 24 as well as the parking valve 71. The parking valve 71 comprises a cylindrical chamber 86 having an intake port 87 and having two outlet ports 88 and 89. A sleeve 90 formed of a material of high wear resisting qualities is secured in the chamber 86 and the bore through the sleeve is formed with two axially spaced annular grooves 91 and 92. The groove 91 registers with the inlet port 87 and the groove 92 registers with the outlet port 88. The inlet port 87 is adapted to communicate with the accumulator 18 through a four-way valve 93 and the outlet port 88 is adapted to communicate directly with the reservoir 17 through the medium of a conduit 94. The outlet port 89, on the other hand, is adapted to communicate with the reservoir 17 through the valve 93. The valve 93 is of the four-way type having a passage 94' for alternatively connecting the inlet port 87 with the accumulator 18 and the outlet port 89 with the reservoir 17.

A valve member 95 is supported for sliding movement in the sleeve 90 and is formed with an enlargement 96 at the lower end which cooperates with adjacent portions of the sleeve and valve member to form an annular chamber 97. The chamber 97 communicates with a chamber 98 in the valve member through ports 99 and also communicates with the inlet ports 41 of the shuttle valves through the ports 100, annular passage 100', ports 101' and annular chamber 102'. The valve chamber 98 communicates with an annular groove 101 formed in the outer surface of the valve member in a position to alternatively register with the grooves 91 and 92 as the valve member moves in opposite directions in the sleeve 90. The valve member 95 is normally urged to the position shown in Figure 5 by a coil spring 102 acting on the lower end of the valve member. In this position of the valve member 95, the groove 101 registers with the inlet port 87 through the groove 91.

In the event it is desired to operate the brakes for parking purposes, the four-way valve 93 is manipulated to register the passage 94' with the accumulator 18 and with the inlet port 87. As a result, fluid under pressure from the accumulator 18 enters the valve chamber 98 and flows through the ports 99 into the chamber 97. Inasmuch as the chamber 97 communicates with the lower ends of the shuttle valve chambers through the inlet ports 41, it follows that the shuttle valves are moved upwardly to close the inlet ports 39 leading to the master cylinders. When the shuttle valves are in the above position, fluid under pressure flows from the accumulator through the parking valve 71 to the brake actuators 27 to apply the brakes.

As fluid under pressure builds up in the chamber 97 it acts on the enlarged end 96 of the valve member and when this pressure exceeds the force of the spring 102 the valve member is moved downwardly to close the inlet port 87. In the event the pressure in the chamber 97 rises above a predetermined value, the valve member moves sufficiently to register the groove 101 with the groove 92 to thereby enable fluid under pressure from the hydraulic actuators to bleed into the reservoir 17. Thus it will be noted that the valve member 95 moves in opposite directions in the valve chamber to maintain the fluid in the systems to the desired parking pressure.

When it is desired to release the hydraulic brake actuators, the four-way valve is merely moved to the position shown by the full lines in Figure 4 to connect the outlet port 88 to the reservoir. Fluid pressure is then permitted to flow from the chamber 97 through the chamber 100', ports 101' and chamber 102' to the outlet port 88 which is connected to the reservoir 17 in the position of the valve 93 shown by the full lines in Figure 4 of the drawings. As a result, fluid pressure in the braking systems drops and the valve member 95 is returned by the spring 102 to the position shown in Figure 5. Also, the shuttle valves 35 are returned by the springs 46 to the position thereof shown in Figure 5 wherein the ports 41 are closed thereby.

Referring now to the embodiment of the invention shown in Figures 8 to 11 inclusive, it will be noted that with the exception of the specific construction of the parking valve 110 and the location of the power valves 111, the braking systems operate in substantially the same manner as set forth in connection with the embodiment of the invention shown in Figures 4 to 7 inclusive. Accordingly corresponding parts of the systems are indicated by like reference characters.

In detail the power valves 111 are located in the respective braking systems between the shuttle valves 24 and the accumulator 18. The specific construction of the power valves shown is the same as the valve shown in Figure 6 of my said copending application Serial No. 546,347, filed July 24, 1944, now abandoned. Briefly it will be noted from Figure 11 that the power valves 111 operate in the same manner as the power valves 70, except for the fact that the valve members 81 are mechanically operated from the operating members 32 instead of being hydraulically operated by the master cylinder as is the case in the embodiment of the invention shown in Figures 4 to 7 inclusive. Therefore it will suffice to point out that when the operating members 32 are actuated to move the valve members 81 downwardly against the action of the springs 82, fluid under pressure flows from the accumulator 18 through the shuttle valves 24 to the hydraulic brake actuators 27.

Upon reference to Figures 9 and 10 it will be noted that the parking valve 110 is similar to the parking valve 71, except that it is controlled by a three-way valve 112 and the intake port 87 is directly connected to the accumulator 18. Also the valve 110 is provided with an additional port 113 which communicates with the annular chamber 97 and with a port 114 in the three-way valve 112. The diametrically opposed port 115 in the three-way valve is connected to the reservoir 17 and the intermediate port 116 is connected to the port 89.

When the three-way valve is in the position shown in Figure 10 the lower ends of the shuttle valves are connected to the reservoir 17 and the parking valve is inoperative. Also in this position it will be noted that the port 114 in the three-way valve is closed so that the chamber 97 contains fluid under pressure even when the valve is in its released position. Thus the valve member 95 operates to maintain the desired parking pressure in the chamber 97 because if this pressure should increase beyond a predetermined value, the valve member 95 merely moves downwardly against the action of the spring 102 to register the annular groove 101 in the valve member with the outlet port 88 to relieve this pressure. As soon as this pressure approaches the predetermined value, the spring 102 moves the valve member 95 upwardly to close the outlet port 88 and to open the intake port 87 if the pressure falls below the desired value.

When the three-way valve 112 is moved to its operative position wherein the passage 117 registers with the ports 114 and 116, it will be noted that the ports 113 and 89 are connected to supply fluid under pressure to the actuators 27 through the shuttle valves 24.

Thus from the foregoing, it will be noted that each embodiment of the invention discloses a hydraulic brake installation having a parking valve which may be used in connection with a single braking system or in connection with a plurality of braking systems to maintain the brakes applied irrespective of expansion and contraction of the braking fluid in the system or systems.

It will further be noted that the parking valves in each embodiment also operate independently of the normal brake operating means and do not interfere with the latter in applying the brake or brakes.

What I claim as my invention is:

1. Hydraulic operating mechanism comprising independent hydraulic systems, an actuator in each system operated by fluid under pressure, an independently operable pressure producing device in each system for supplying fluid under pressure to the actuators, a control valve between the device and actuator of each system, an accumulator containing fluid under pressure, and a valve common to said systems located between the control valves and accumulator for operating the control valves to close communication between the latter and said devices and to connect the actuators to the accumulator for supplying fluid under pressure to the actuators in each of the systems independently of said devices.

2. Hydraulic operating mechanism comprising independent hydraulic systems, an actuator in each system operated by fluid under pressure, an accumulator containing fluid under pressure, a reservoir for the fluid, a power valve in each system for respectively connecting the actuators in said systems to the accumulator, independently operable pressure producing devices for respectively actuating the power valves, and a parking valve operable independently of said devices for connecting the accumulator to the actuators in each system.

3. Hydraulic operating mechanism comprising independent hydraulic systems, an actuator in each system operated by fluid under pressure, an accumulator containing fluid under pressure, a reservoir for the fluid, a power valve in each system for respectively connecting the actuators in said systems to the accumulator, independently operable pressure producing devices for respectively actuating the power valves, and a parking valve operable independently of said devices for connecting the accumulator to the actuators in said systems and having a valve member movable in response to pressure variations in the systems above and below a predetermined value to alternatively connect the actuators to the accumulator and reservoir.

4. Hydraulic operating mechanism comprising independent hydraulic systems, an actuator in each system operated by fluid under pressure, a pressure producing device in each system for independently supplying fluid under pressure to the actuators, a control valve between the device and actuator of each system, an accumulator containing fluid under pressure, a reservoir for fluid, a power valve between the control valve and hydraulic actuator of each system and operable by the fluid under pressure passing through the control valves to connect the actuators to the accumulator, and a parking valve common to said systems operable independently of said devices for actuating the power valves to connect the accumulator to the actuators and having a valve member movable in response to pressure variations in the systems above and below a predetermined value to alternatively connect the actuators to the accumulator and reservoir.

5. Fluid pressure operating mechanism comprising independent fluid pressure systems, each system having a pressure producing device and having an actuator connected to the device for operation by the latter, a supply of fluid under pressure common to both systems, a control valve in each system between the pressure producing device and actuator operable to alternatively connect the actuator to the pressure producing device and common fluid pressure supply, and a valve between said fluid pressure supply and said control valves for controlling the operation of the latter.

6. Fluid pressure operating mechanism comprising independent fluid pressure systems, each system having a pressure producing device and an actuator connected to the device for operation by the latter, a supply of fluid under pressure common to both systems, a control valve in each system between the pressure producing device and the actuator movable to one position to provide a fluid connection from the pressure producing device to the actuator and movable to a second position by the fluid under pressure from said common supply to close the fluid connection aforesaid from the pressure producing device to the actuator, and to connect the actuator to said common fluid pressure supply and a valve between the common fluid pressure supply and said control valves for selectively and simultaneously opening and closing the fluid connections between the control valves and the common fluid pressure supply.

7. Fluid pressure operating mechanism comprising independent fluid pressure systems, each system having a pressure producing device and having an actuator connected to the device for operation by the latter, a supply of fluid under pressure common to both systems, a control valve in each system between the pressure producing device and actuator, said control valve being provided with a chamber having an intermediate port connected to the actuator and having second and third ports at opposite sides of the intermediate port respectively connected to the pressure producing device and common fluid pressure supply, a valve member in the chamber of each control valve normally positioned to connect the second port to the intermediate port and movable to a second position by the fluid pressure at the third port for connecting the latter to the intermediate port and for closing the second port, and a valve between the common fluid pressure supply and the control valves for selectively connecting the third ports of the two control valves to said common fluid pressure supply.

8. Fluid pressure operating mechanism comprising independent fluid pressure systems, each system having a pressure producing device and having an actuator connected to the device for operation by the latter, a second supply of fluid under pressure, a control valve in each system between the pressure producing device and actuator for alternatively connecting the actuator to the pressure producing device and second source of fluid pressure supply, and a valve between the second fluid pressure supply and the control valves for controlling the operation of the latter.

9. Fluid pressure operating mechanism comprising independent fluid pressure systems, each system having a pressure producing device and having an actuator connected to the device for operation by the latter, a second supply of fluid under pressure, a control valve in each system between the pressure producing device and actuator for alternatively connecting the actuator to the pressure producing device and second source of fluid pressure supply, a valve common to both systems and located in a fluid connection between the actuators and the control valves, said valve having a valve member movable to one position to connect the actuators to the second source of fluid supply and movable to another position in response to a predetermined pressure rise at the brake actuators to connect the actuators to the reservoir, and means operated by fluid pressure from the second source in response to movement of the valve member to said first position for operating the control valves to close communication between the latter and pressure producing device.

LUDWIG A. MAJNERI.

REFERENCES CITED

The following references are of record in the file of this patent:

UNITED STATES PATENTS

| Number | Name | Date |
| --- | --- | --- |
| 1,938,979 | Sawtelle | Dec. 12, 1933 |
| 2,009,515 | Pardee | July 30, 1935 |
| 2,148,268 | Kerr | Feb. 21, 1939 |
| 2,213,947 | Bowen | Sept. 10, 1940 |
| 2,254,890 | Gardiner | Sept. 2, 1941 |
| 2,306,346 | Rockwell | Dec. 22, 1942 |
| 2,312,726 | Munro | Mar. 2, 1943 |
| 2,331,214 | Milster | Oct. 5, 1943 |
| 2,366,606 | Fites | Jan. 2, 1945 |
| 2,367,194 | Boldt | Jan. 16, 1945 |
| 2,394,343 | Vorech | Feb. 5, 1946 |